US006694722B2

United States Patent
Kreitmeier

(10) Patent No.: US 6,694,722 B2
(45) Date of Patent: Feb. 24, 2004

(54) RECUPERATOR FOR THERMAL POWER INSTALLATION

(75) Inventor: Franz Kreitmeier, Baden (CH)

(73) Assignee: Alstom Technology Ltd, Baden (CH)

( * ) Notice: Subject to any disclaimer, the term of this patent is extended or adjusted under 35 U.S.C. 154(b) by 25 days.

(21) Appl. No.: 10/105,443

(22) Filed: Mar. 26, 2002

(65) Prior Publication Data

US 2003/0033810 A1 Feb. 20, 2003

Related U.S. Application Data

(60) Provisional application No. 60/312,784, filed on Aug. 17, 2001.

(51) Int. Cl.[7] ................................................. F02C 7/10
(52) U.S. Cl. ...................................... 60/39.511; 60/727
(58) Field of Search ....................... 60/772, 778, 39.511, 60/39.512, 727

(56) References Cited

U.S. PATENT DOCUMENTS

| 2,973,622 | A | | 3/1961 | Nettel |
| 3,677,008 | A | | 7/1972 | Koutz |
| 3,872,673 | A | | 3/1975 | Margen |
| 4,043,120 | A | * | 8/1977 | Hoffeins .................. 60/39.511 |
| 4,147,204 | A | | 4/1979 | Pfenninger |
| 4,150,547 | A | | 4/1979 | Hobson |
| 4,523,432 | A | | 6/1985 | Frutschi |

FOREIGN PATENT DOCUMENTS

| DE | 24 44 909 | 4/1976 |
| EP | 0 003 980 | 9/1979 |
| GB | 753930 | 8/1956 |
| JP | 08-061085 | 3/1996 |

* cited by examiner

*Primary Examiner*—Louis J. Casaregola
(74) *Attorney, Agent, or Firm*—Burns, Doane, Swecker & Mathis, L.L.P.

(57) ABSTRACT

A recuperator (10) in a thermal power installation such as, for example, a gas turbine installation or air storage power installation, having turbines (15a, 15b) and a generator (G), has sectors (S1–S4) with tubes for the circulation of air. Hot exhaust gases from the turbines (15a, 15b) are supplied to the recuperator (10) for the purpose of heating the air flowing through the sectors (S1–S4). According to the invention, the recuperator (10) has one or a plurality of external heat storage devices (HS1, HS2, HS3) which are connected between the (S1–S4) of the recuperator (10) and are heated during the normal operation of the power installation. During an outage period of the power installation, air is circulated through the installation components (10, 15a, 15b, 19), a temperature distribution being maintained in these components with temperature differences which are smaller than a critical magnitude with respect to transient thermal stresses in the components of the recuperator. After an outage period, the power installation can be started up to full load in a short time and without risk with respect to transient thermal stresses in the recuperator (10), turbines (15a, 15b) and combustion chamber (19).

6 Claims, 3 Drawing Sheets

RECUPERATOR FOR THERMAL POWER INSTALLATION

This application claims priority under 35 U.S.C. §119 to U.S. Provisional Application No. 60/312,784 entitled COMPRESSED AIR ENERGY SYSTEMS and filed on Aug. 17, 2001, the entire content of which is hereby incorporated by reference.

FIELD OF THE INVENTION

The invention relates to a recuperator in a thermal power installation such as, for example, an air storage power installation, air from a storage cavern being heated by means of hot exhaust gases in the recuperator, which air is supplied to turbines after it has been heated.

BACKGROUND OF THE INVENTION

Recuperators of this type are used for heating air which is intended for driving turbines, the air being heated by heat transfer from the exhaust gases of the turbines. They are employed in thermal power installations such as, for example, air storage power installations.

In air storage installations, the air from a storage cavern is heated. Power installations of this type are, for example, known from the Patent Specification WO 96/01942.

An important function of air storage power installations in the present-day electricity market is their use during peak load periods in which other power installations' electricity demand is not sufficiently covered. Such peak load periods often occur at short notice and, for this reason, it is also necessary for air storage power installations to have the capability of being started up rapidly. This means that they can be started up again to full load from standstill or reduced operation as rapidly as possible.

A typical air storage power installation such as is in operation in Alabama, USA, for example, is shown in FIG. 1. The power installation 1 comprises a storage cavern 2, in which air is stored at a certain pressure and a typical temperature of approximately 35° C. and, in addition, a recuperator 3, a generator G, two turbines with a high-pressure turbine 4 and a low-pressure turbine 5, upstream of which is respectively connected a high-pressure combustion chamber 6 and a low-pressure combustion chamber 7. When the power installation is put into operation, the stored air is supplied via the duct 8 to the recuperator 3. There, it flows through one or a plurality of sectors, each consisting of a pipework system, the stored air being heated to above 300° C. by heat exchange with hot exhaust gases from the low-pressure gas turbine. After it has been heated, the air is supplied via a duct to the turbine group. The hot exhaust gases from the low-pressure turbine 5 are supplied via the duct 9 to the recuperator 3.

Recuperators of the prior art can also comprise a so-called selective catalytic reduction system (SCR) for the purpose of reducing pollutant exhaust gases such as, for example, $NO_x$.

When starting up an air storage power installation, in particular in the case of a cold start after a fairly long outage period, the combustion chambers, the turbines and also the recuperator are, inter alia, started up, temperatures of between 300° C. and 550° C. being attained. During a cold start, it is then necessary to take account of the temperature distribution in the items of equipment in order to ensure risk-free operation. During the outage period of the installation, namely, the temperature distribution in the power installation components mentioned evens out and there is a reduction in their average temperature. During the subsequent start, the thermal load may only be applied gradually to the components because, otherwise, the component details such as the tubes of the recuperator, for example, are subjected to marked transient stresses.

In the recuperator of the prior art, as shown in FIG. 1, the heating of the air (relaxation or temperature response) takes place with delay. This is a consequence of the thermal capacity of the recuperator and is strongly marked, particularly in the case of high pressures such as occur in air storage power installations and in the case of high efficiencies. This effect makes the cold start of the high-pressure turbine more difficult and, under certain circumstances, imposes the need for the high-pressure combustion chamber 6 of FIG. 1. In addition, the delayed temperature response leads to a likewise delayed effective appearance of the selective catalytic reduction (SCR). The limitation to a gradual increase in the thermal load leads to a loss of time when starting up the air storage power installation, which makes it impossible for the installation function of covering peak times to occur at short notice and endangers the economic success of the air storage power installation per se.

SUMMARY OF THE INVENTION

Based on this prior art, the object of the present invention is to create a recuperator for a thermal power installation, which latter can be started up, without loss of time, to full load after an outage period or reduced power operation. In particular, the power installation is to be able to be put into operation—as compared with the prior art—both in a reduced start-up time and without risk, its start-up time being matched as far as possible to that of the turbines or, preferably, markedly bettering this start-up time.

This object is achieved by means of a recuperator according to claim 1 and a method for its operation according to claim 5. Special and preferred embodiments of the invention are given in the sub-claims.

A recuperator for an air storage power installation having at least one turbine such as, for example, a high-pressure turbine and low-pressure turbine, at least one combustion chamber and a generator, has a sector or a plurality of sectors in a recuperator casing, which sectors each exhibit a duct system for the heating of air by heat transfer from hot exhaust gases from a gas turbine, and which recuperator is connected to air supply ducts and transfer ducts to the at least one turbine. According to the invention, the recuperator has one or a plurality of external heat storage devices, which are connected between the sectors of the recuperator. In the case of a single sector in the recuperator, an external heat storage device is connected before and/or after this sector.

During a normal on-load operation, the external heat storage devices have the function of storing heat which is used during an installation outage to keep the individual sectors of the recuperator, together with the combustion chambers and turbines, sufficiently warm so that they do not cool. During the outage period of the installation, the heat storage devices ensure the heat which is necessary for maintaining a temperature distribution in the recuperator and the turbines, which temperature gradients are not larger than the critical temperature gradients which cause critical, transient stresses in the components of the recuperator and the turbines.

The external heat storage devices are expediently arranged outside the recuperator casing.

In a special embodiment of the invention, the one or the plurality of external heat storage devices are provided with water as the thermal heat storage medium or, in the case of higher temperatures, with a solid such as, for example, sand or stone.

In a method of operating the recuperator according to the invention, the external heat storage devices are, during the normal on-load operation of the power installation, brought to the temperature of the recuperator. During an installation outage, the recuperator, the turbines and the combustion chambers are then continuously or discontinuously flooded during a heat retention phase, by which means a temperature distribution is attained and maintained in the recuperator, the temperatures of the various sectors of the recuperator not falling below the temperature of the nearest heat storage device. This ensures that temperature gradients in the recuperator and the turbines remain smaller than a specified critical value.

In a special embodiment of the method according to the invention, the temperature distribution in the recuperator is held in such a way that the difference between the temperatures of the storage media of two adjacently connected heat storage devices remain smaller than the critical temperature with respect to transient stresses.

In one embodiment of the invention, the recuperator is flooded by air or air flows through it.

In one variant of the invention, the recuperator is flooded by air from the atmosphere, this air being supplied to the recuperator by means of a fan.

In a further variant, in which the thermal power installation is an air storage power installation, the recuperator is flooded by air from a storage cavern.

In a further special embodiment of the operating method, a flushing operation of the recuperator, the combustion chambers and the turbines takes place with preheated air after the flooding of the recuperator for the purpose of low-stress operation, in which the inner volume of the recuperator and the turbine group is exchanged several times. In this way, not only the components of the recuperator but also those of the turbines are protected from transient stresses. The power installation is subsequently started up to full load.

The recuperator according to the invention and the operating method according to the invention provide the advantage that the power installation can be started up rapidly to full load, because the temperature difference between successive heat storage devices lies within the risk-free region with respect to transient stresses for the materials of the components of the recuperator. By avoiding temperature differences of more than 160 K, transient stresses in the tube walls of the sector are avoided and the risks with respect to life of the associated tube walls of the ducts are avoided.

In particular, the power installation can be started up in a time which lie [sic] markedly below the start-up times of a normal gas turbine.

In addition, they provide the advantage that the high-pressure combustion chamber, which is arranged upstream of the high-pressure turbine in the power installations of the prior art, can be omitted without replacement. This provides the further advantage that the power installation produces less $NO_x$ which, in installations of the prior art, originate [sic] mainly from this high-pressure combustion chamber. The invention also provides the advantage that the SCR functions immediately.

In addition, no segmentation of high-pressure turbine rotor and stator is necessary.

The avoidance of large temperature gradients during start-up of the installation provides, finally, the avoidance of flaking of oxide layers on the surfaces of the recuperator components.

The recuperator and the method of operating it according to the invention can be applied in all types of thermal power installations such as, for example, gas turbine and air storage power installations. The invention is explained in more detail below using, as an example, an air storage power installation and the drawings.

DETAILED DESCRIPTION OF THE INVENTION

Figure 1:
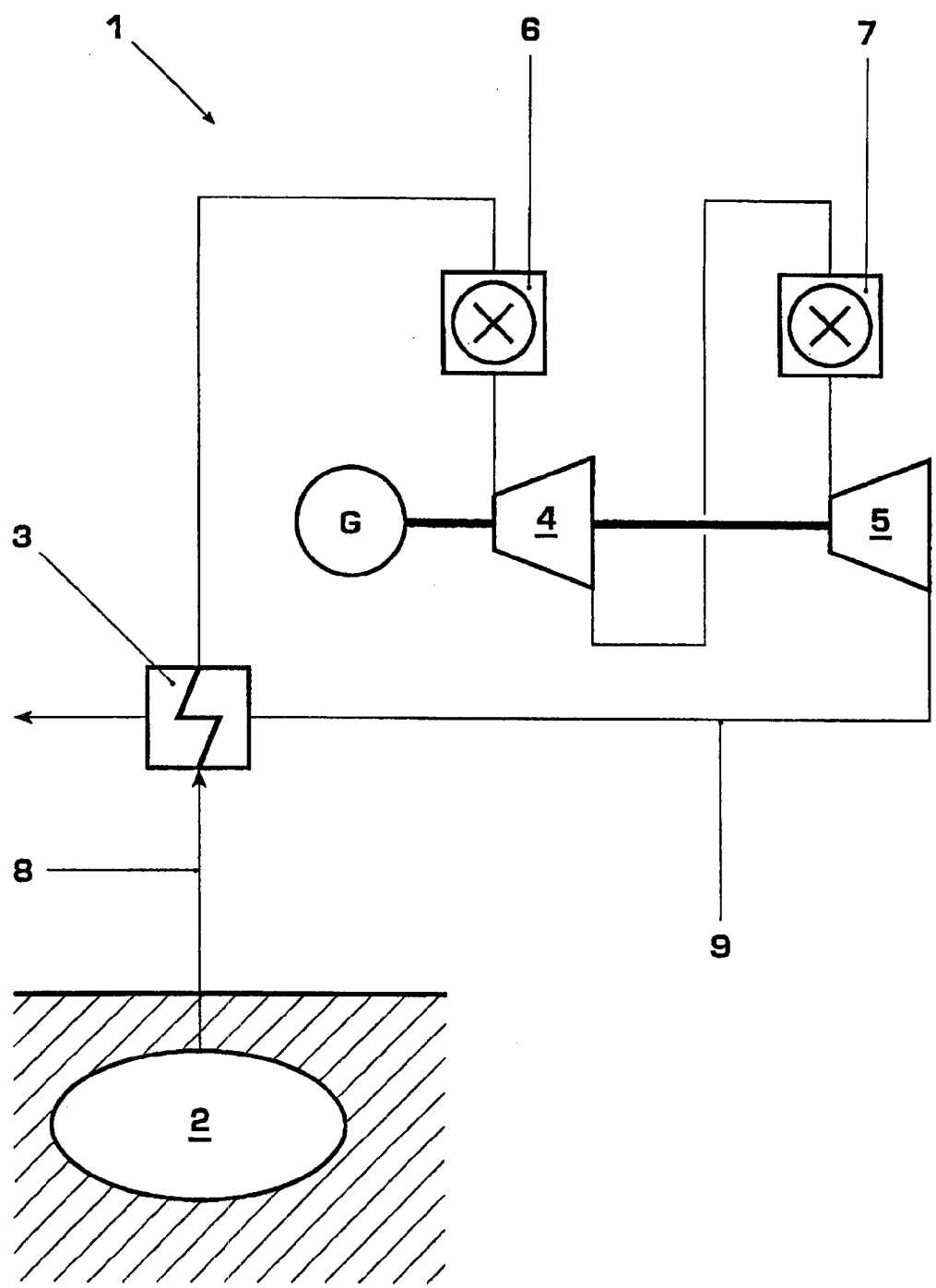
FIG. 1 shows a diagram of an air storage power installation, according to the prior art, with a recuperator for heating air from a storage cavern.

FIG. 1 has already been explained in association with the prior art.

Figure 2:
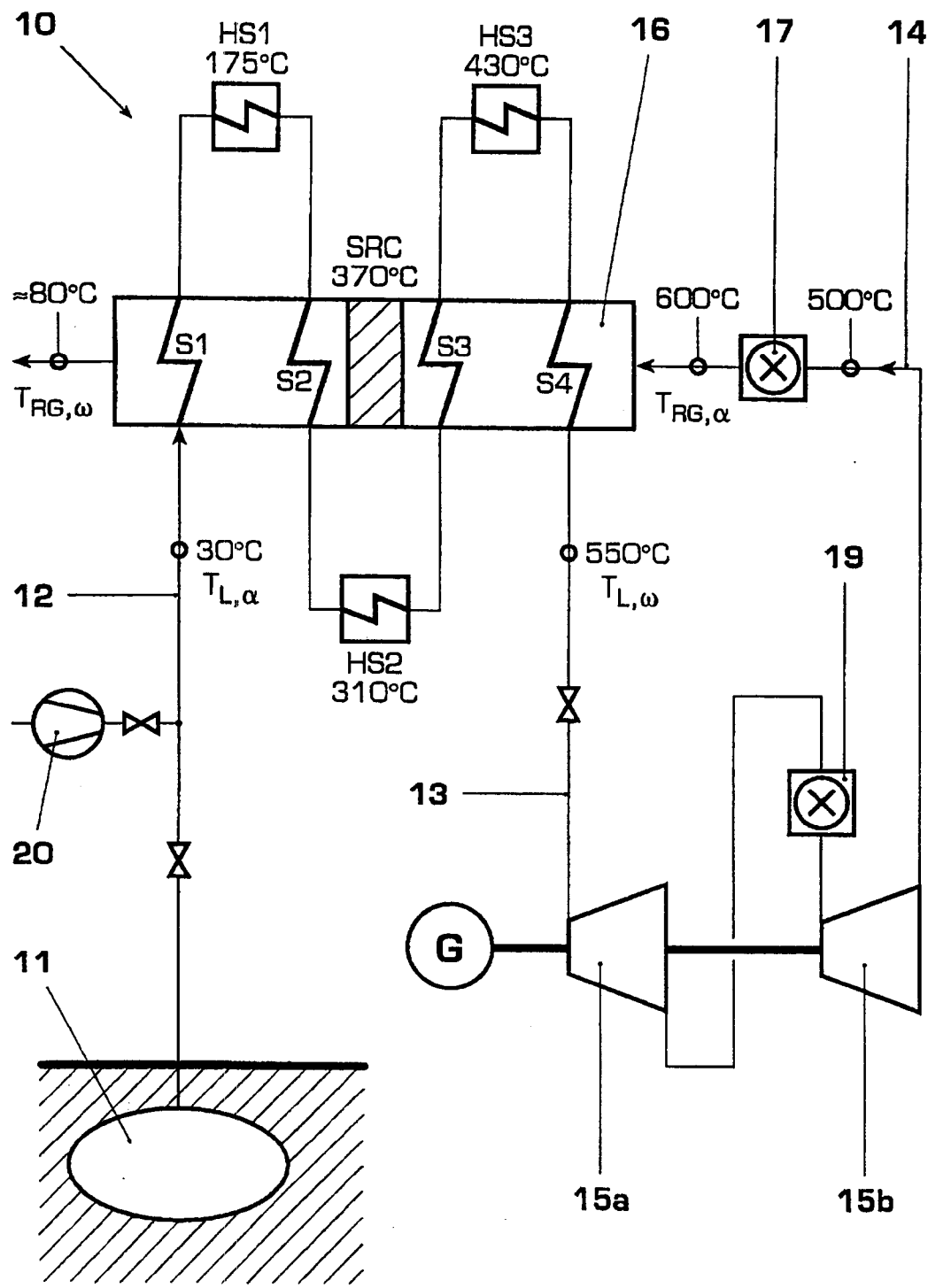
FIG. 2 shows a diagram of a recuperator in an air storage power installation according to the invention.

FIG. 2 shows, diagrammatically, a recuperator 10 according to the invention. It can, for example, be employed in an air storage power installation 1 of FIG. 1. Air from a storage cavern 11 is supplied via the duct 12 at a temperature of approximately 30° C. to the recuperator 10. On entry into the recuperator, this air has a temperature $T_{L,\alpha}$. Within the casing 16, the recuperator 10 has a plurality of sectors S1, S2, S3, S4, through which air flows sequentially. In this process, the air is heated and has a temperature $T_{L,w}$ on outlet from the recuperator. After flowing out from the recuperator 10, the air, heated to approximately 550° C., is supplied via the duct 13 to the turbine group, with high-pressure turbine 15a and low-pressure turbine 15b. Hot exhaust gases from the turbine group and an afterburner 17 are led via a duct 14 into the recuperator 10, in which they flow around the sectors S1–S4 and heat the air in the process. On entry into the recuperator 10, the hot exhaust gases have a temperature $T_{RG,\alpha}$ and, on outlet from the recuperator, a temperature $T_{RG,w}$. The temperatures of the hot exhaust gases are typically 600° C. on entry and typically 80° C. on outlet.

These inlet and outlet temperatures give a high recuperator efficiency of (550–30° C.)/(600–30° C.)=0.91 and a low temperature difference of 600 K–550 K=50 K.

According to the invention, the recuperator 10 has a plurality of external heat storage devices HS1, HS2, HS3, which are respectively connected between the individual sectors S1, S2, S3 and S4 and are arranged outside the recuperator casing 16. During normal on-load operation of the air storage power installation, the heat storage devices HS1–HS3 are heated to temperatures corresponding to their position in the recuperator 10. In this arrangement, the heat storage devices are arranged in such a way relative to the sectors S1–S4 that the temperature differences between successive heat storage devices are not greater than 100–160 K, preferably approximately 130 K or the critical temperature for transient stresses in the recuperator pipework. This ensures that transient stresses are avoided during the heating and heat retention operations. For this purpose, the heat storage device HS1 has a temperature of approximately 180° C. after the heating operation, the heat storage device HS2 has a temperature of approximately 310° C. and the heat storage device HS3 has a temperature of 430° C.

During the outage period, heat retention operation takes place in which the recuperator 10 is flooded with a minimal mass flow of air from the storage cavern 11 and the turbines 15a and 15b do not rotate. The turbines are then flooded by air at the temperature of the third heat storage device HS3. This temperature of 430° C. also corresponds approximately to the average temperature of rotor and stator.

The recuperator is either continuously or discontinuously flooded, depending on the temperature profile within the recuperator, which is achieved by the heat retention operation.

In one variant of the operation, the air for flooding the recuperator is taken directly from the atmosphere and is supplied to the recuperator 10 by means of the fan 20. This is more suitable when there is a requirement to economize on valuable high-pressure air (of approximately 80 bar) from the storage cavern 11.

Water or sand, for example, are suitable as the heat storage medium. In view of the temperatures, water is only suitable for the first heat storage device HS1, the pressure necessary for the 180° C. water being 10 bar. The temperatures of the further heat storage devices HS2 and HS3 are near or above the maximum employment temperature of water of 280° C. at 64 bar. For this reason, sand, or even stone, is more suitable as storage media for the heat storage devices at higher temperature. Further possible types of heat storage devices are chemical heat storage devices and latent heat heat storage devices.

After the heat retention operation of the recuperator, a flushing operation for the air storage gas turbine and the recuperator is additionally carried out before the actual start-up of the power installation. For this purpose, the inner air volumes of the recuperator and the turbine group are exchanged several times. This is intended to prevent any detonation.

The flushing operation typically lasts approximately five minutes and takes place under the same conditions as those in heat retention operation. There is likewise, therefore, no cooling and no transient stresses occur. After this, the starting procedure can take place under optimally prepared conditions.

The high-pressure combustion chamber can be omitted without replacement in the case of an air storage power installation with a recuperator according to the invention. Because the already preheated air expands in the high-pressure turbine, no problems with excessively low temperatures occur at this location. During this process, the low-pressure turbine experiences idling conditions (with outlet temperatures of, for example, 250 K lower than in the case of full-load conditions) up to full-load conditions. If the afterburner 17 is dispensed with, no problems with transient stresses occur during idling conditions because the temperature level of the third heat storage device is only approximately 180 K higher.

Figure 3:
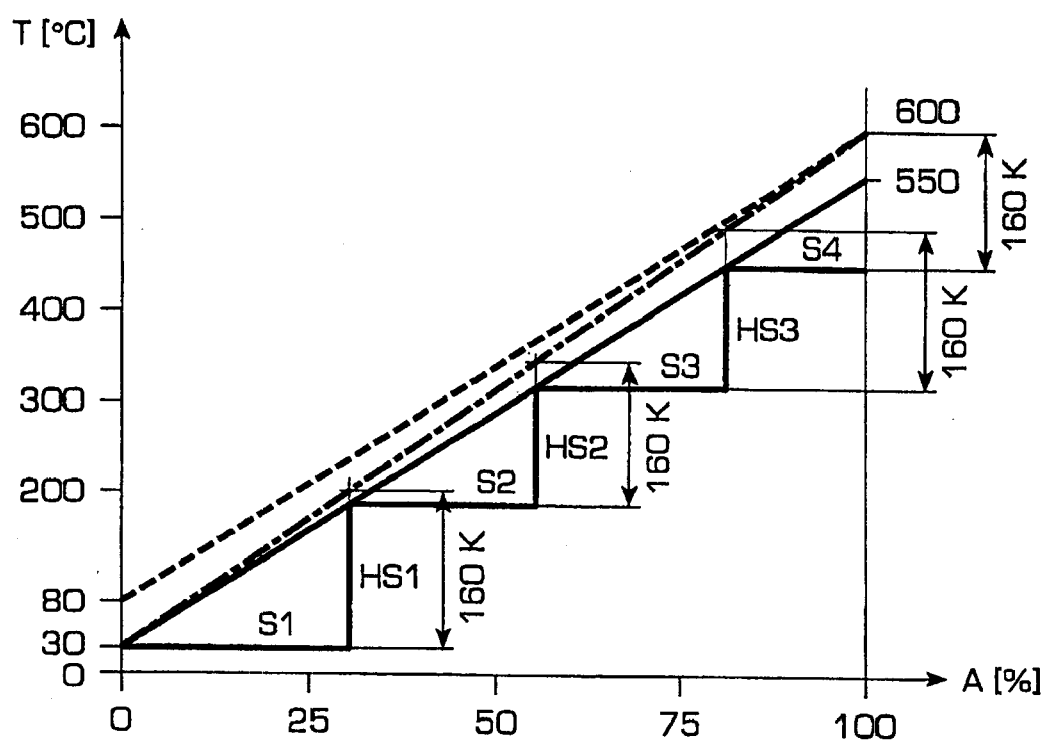
FIG. 3 shows a diagram to illustrate the heating of the air as a function of the recuperator surface, together with the variation of the temperature of the turbine exhaust gases.

FIG. 3 shows various temperatures in the recuperator as a function of the recuperator area A.

The full, almost straight line corresponds to the steady-state variation of air being heated, $T_L$, starting with the inlet temperature $T_{L,\alpha}$ of 30° C. and ending with the outlet temperature $T_{L,w}$ of 550° C.

The dashed line gives the steady-state temperature variation of the hot turbine exhaust gases, with $T_{RG,\alpha}$ of 600° C. at entry into the recuperator, during the flow through the complete recuperator as far as the outlet from the recuperator where its temperature is $T_{RG,w}$ of 80° C.

The chain-dotted curve gives the variation of the temperature of the exhaust gases in transient full-load operation. It begins at 600° C., the inlet temperature of the hot turbine exhaust gases into the recuperator and ends at 30° C., the air temperature at the inlet into the recuperator.

The full and stepped line shows the temperature variation of the air and the tube wall temperatures in the sectors S1–S4 during start-up of the installation or during the heat retention phase. The maximum temperature difference between the exhaust gas temperature, as shown by the chain-dotted line, and the temperatures of the tube walls always remains below 160 K, which also corresponds to the maximum transient temperature difference. This means that even in the extreme situation, in which the low-pressure turbine is spontaneously brought to full load, no temperature differences of more than 160 K occur and, therefore, the air storage power installation can, in all cases, be started up in a short time and without risks, i.e. without critical, transient stresses.

The design of a recuperator with three external heat storage devices, as shown in FIG. 2, therefore provides this maximum temperature difference of 160 K which, from experience, is tolerable. This maximum temperature difference can be lowered by designing a recuperator with four or more external heat storage devices.

It is also important for the SCR to be kept at operating temperature. It will, therefore, also develop its effect in the case of a cold start.

List of designations

1 Air storage power installation
2 Storage cavern
3 Recuperator
4 High-pressure turbine
5 Low-pressure turbine
6 High-pressure combustion chamber
7 Low-pressure combustion chamber
8 Supply duct for air
9 Supply duct for exhaust gases
10 Recuperator
11 Storage cavern
12 Supply duct for air
13 Transfer duct to the turbine
14 Transfer duct for exhaust gases
15a High-pressure turbine
15b Low-pressure turbine
16 Casing
17 Afterburner (optional)
19 Low-pressure combustion chamber
20 Fan (optional)
S1, S2, S3; S4 Sectors in the recuperator
HS1, HS2, HS3 External heat storage devices

What is claimed is:

1. A recuperator for thermal power installation having at least one turbine, at least one combustion chamber and a generator (G), the recuperator having one or a plurality of sectors with tubes for the purpose of heating air by heat exchange from exhaust gases from the at least one turbine and being connected to a duct for the supply of air and a transfer duct to the at least one turbine, wherein the recuperator comprises one or a plurality of external heat storage devices, which are connected between two sectors of the plurality of sectors of the recuperator.

2. The recuperator as claimed in claim 1, wherein the one or a plurality of external heat storage devices contain water, sand or stone as heat storage medium.

3. The recuperator as claimed in claim 1, wherein the one or a plurality of external heat storage devices are configured as chemical heat storage device or latent heat storage device.

4. The recuperator as claimed in claim 1, wherein the temperature difference between two successive external heat storage devices in the air flow direction is less than 100 K.

5. The recuperator as claimed in claim 1, wherein the temperature difference between two successive external heat storage devices in the air flow direction is less than 130 K.

6. The recuperator as claimed in claim 1, wherein the temperature difference between two successive external heat storage devices in the air flow direction is less than 160 K.

* * * * *